United States Patent [19]  [11] 3,945,465
Vander Horst et al.  [45] Mar. 23, 1976

[54] MULTI-FUNCTION AIR TREATMENT UNIT

[75] Inventors: John Vander Horst, Lakewood; Myron Dunn, Littleton, both of Colo.

[73] Assignee: Wilkerson Corporation, Englewood, Colo.

[22] Filed: Nov. 7, 1974

[21] Appl. No.: 521,575

Related U.S. Application Data

[63] Continuation of Ser. No. 350,967, April 13, 1973, abandoned.

[52] U.S. Cl. ............................. 184/6.24; 184/56 A
[51] Int. Cl.² ...................................... F01M 1/00
[58] Field of Search.... 184/55 R, 55 A, 56 R, 56 A, 184/6.26, 7, 6.24

[56] References Cited
UNITED STATES PATENTS

| | | | |
|---|---|---|---|
| 3,074,510 | 1/1963 | Thomas | 184/55 A |
| 3,076,526 | 2/1963 | Thomas | 184/55 A |
| 3,078,959 | 2/1963 | Thomas | 184/55 A |
| 3,086,616 | 4/1963 | Thomas | 184/55 A |
| 3,559,764 | 2/1971 | Wheeler | 184/55 A |
| 3,559,764 | 2/1971 | Wheeler | 184/55 A |
| 3,572,469 | 3/1971 | Miller | 184/55 A |
| 3,606,936 | 9/1971 | Obergefell | 184/55 A |

Primary Examiner—Richard C. Pinkham
Assistant Examiner—Marvin Siskind
Attorney, Agent, or Firm—Burton, Crandell & Polumbus

[57] ABSTRACT

This invention relates to a unitized air line filter and lubricator that includes provision for a pressure regulator therebetween that can either be by-passed or rendered operative by simply opening certain preformed passages in the manifold that connect same in series with the previously-mentioned components. The manifold houses nearly all of the working parts of both the filter and lubricator and their arrangement is such that the manifold can be reversed end-for-end to accommodate opposite directions of air flow. The subassembly that includes the bowls for the filter and lubricator along with the regulator spring therebetween in the three-component version will accommodate the manifold in either of its two positions and is, therefore, reversible relative thereto. Special sets of mounting brackets permit use of a single combination unit with air line piping of various sizes. These brackets also include a quick-disconnect feature wherein the entire combination unit can be detached therefrom and either serviced or replaced with another like unit in a very short time using only an allen wrench. The subassembly that carries the bowls includes a pair of quick-disconnect latches that are manually operated without any tools being required and which provide instant access to the bowls which are also removable.

23 Claims, 7 Drawing Figures

MULTI-FUNCTION AIR TREATMENT UNIT

This is a continuation of application Ser. No. 350,967, filed Apr. 13, 1973, and since abandoned.

BACKGROUND OF THE INVENTION

In all but rare instances, any industrial pneumatic system requires that the supply pressure be stepped-down and regulated at some lower working pressure. In addition, the air itself must be filtered to remove entrained moisture and other impurities while lubricants are often added to keep those pneumatic tools and other devices operated thereby properly oiled. The ordinary pneumatic system, therefore, requires not one, but several, lubricators, filters system pressure regulators located at various points downstream of the supply.

In the past, individual components have been serially connected into the supply line wherever needed. Each such component customarily required several fittings such as reducers, elbows, nipples, couplings and the like to integrate same into the existing air supply. Not only was such a procedure time-consuming and expensive, the individual components became difficult to service, repair or replace, oftentimes resulting in a complete shutdown of the system for protracted periods. Even mounting the components on the wall or other supporting surface was oftentimes done in a haphazard fashion thus resulting in an insecure as well as unsightly assemblage of uncoordinated parts.

It is the principal object of the present invention to provide a novel unitized filter-lubricator or filter-regulator-lubricator unit for use in pneumatic systems.

A second object is to provide a device of the type aforementioned that is reversible end-for-end to accommodate flow in either direction.

Another object of the invention is to provide a filter-lubricator unit with a partially-completed regulator section that can be either by-passed or rendered operative by finishing the incomplete passages and adding an adjustable control valve.

Still another objective of the invention is the provision of a combination unit wherein the manifold carries most, if not all, of the working parts of both the filter and lubricator while a detachable bowl carrying subassembly carries the gage and is reversible relative thereto.

An additional object is to provide an integrated multi-component combination air service unit for pneumatic systems that includes special wall mounts which enable it to integrate into any of the common sized air lines or to be removed therefrom by relatively unskilled persons using simple tools and with a minimal interruption in service.

Further objects are to provide a combination filter-regulator-lubricator unit for air lines that is simple, compact, easy to service, versatile, relatively inexpensive, rugged, dependable, efficient and decorative.

Other objects and advantages of the present invention will become apparent as the description of the present invention proceeds taken in conjunction with the description of the drawings that follows, and in which.

SUMMARY OF THE INVENTION

It has now been found in accordance with the teaching of the instant invention that these and other shortcomings of the prior art pneumatic systems can, in large measure, be overcome by the simple, but unobvious, expedient of combining at least a filter and lubricator, and preferably a regulator also, into a single unitized assembly. By specifying the proper set of wall-mounting brackets, the unit will integrate with all the common sizes of air lines with simple threaded connections being all that are required at its inlet and outlet ends. Not only do these brackets provide for a sturdy and decorative wall mounting, they also permit the entire unit to be quickly and easily detached therefrom with a minimum of down-time in case replacement or repair becomes necessary. Periodic servicing such as cleaning of the bowls can be accomplished even more quickly by merely detaching the bowl-carrying subassembly from the manifold.

The manifold can be reversed end-for-end to accommodate air flow in either of two opposite directions and the bowl-carrying subassembly is symmetrical about a transverse centerline thus making it reversible relative to the latter. While the bowls themselves are usually identical and will, therefore, accommodate either the filter or the lubricator, they are also removable and interchangeable so that they needn't necessarily be alike. For example, one could include an automatic drain of some type while the other has a manual one or none at all.

Finally, the manifold is designed with partially-completed porting which, upon completion, will integrate a regulator into the assembly. If the customer chooses to eliminate the regulator and purchase only the filter and lubricator, the partially-completed porting is left closed and the regulator subsection is by-passed while certain appurtenances necessary to the regulating function, like the control valve, are eliminated in favor of an inexpensive cap that produces a finished appearance. The pressure gage is left in the unit to monitor the air pressure.

DESCRIPTION OF THE PREFERRED EMBODIMENT

Figure 4:
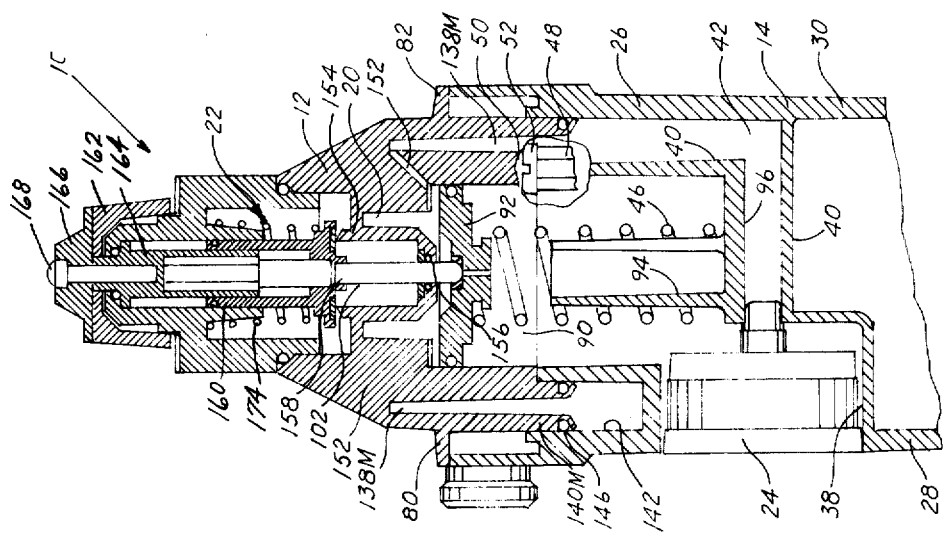
FIG. 4 is a fragmentary transverse section taken along line 4—4 of FIG. 3 and with a portion broken away to more clearly reveal the interior construction.

The combination unit embodying the present invention has been broadly designated by reference numeral 10 and includes a manifold subassembly 12 and a bowl subassembly 14 detachably connected to one another in a manner which will be set forth in greater detail presently. The manifold subassembly is, in turn, subdivided into sections, the first being the filter section 16 and the last the lubricator section 18 with the regulator section 20 located therebetween when rendered operative, otherwise, the latter section is by-passed. Even when center section 20 does not include a pressure regulator 22, a pressure gage 24 is preferably connected to communicate with the air flowing therethrough in the manner indicated in FIG. 6. On the other hand, when pressure regulator 22 is included as a part of the combination unit as shown in FIGS. 1, 3, 4 and 7, this same gage 24 is connected to indicate the secondary pressure in the downstream side of the latter as seen in FIG. 4.

The bowl subassembly 14 comprises an open-tapped shell 26 or housing having a front wall 28, a rear wall 30 and right and left side walls 32R and 32L, respectively, all of which cooperate to produce a bowl guard. These walls are vertically-slotted to define windows 34 which open upon the bowls 36R and 36L located immediately therebehind. In addition, the front wall 28 has a centrally-located circular window 38 opening onto the dial of gage 24. Since this gage stays with the bowl subassembly 14 even though the manifold 12 is reversible end-for-end relative to the latter, the dial always faces the front.

Extending transversely of the bowl subassembly is a partial partition wall 40 in which is defined an integral preformed passage 42 which communicates between the pressure-responsive element (not shown) of a gage 24 with the main air passage 44 of the manifold 12. This partition wall 40 also supports a compression spring 46 of the regulator when one is included. The bowls 36R, 36L are retained in the shell 26 by means of integrally-formed upstanding posts 48 (FIGS. 3–7) which receive threaded screws 50, the heads 52 of which overhang the rims 54 of the bowls.

Generally cup-shaped integral webs bridge the gaps left between the partition wall, the front and rear walls, and the adjacent side walls to define a pair of partial bottom walls 56R and 56L in supporting relation to their respective bowls. These bottom walls each have an opening 58 therein sized to receive the petcock 60 or other element of similar nature provided in the bottom of the bowl for the purpose of draining fluid therefrom.

Figure 1:
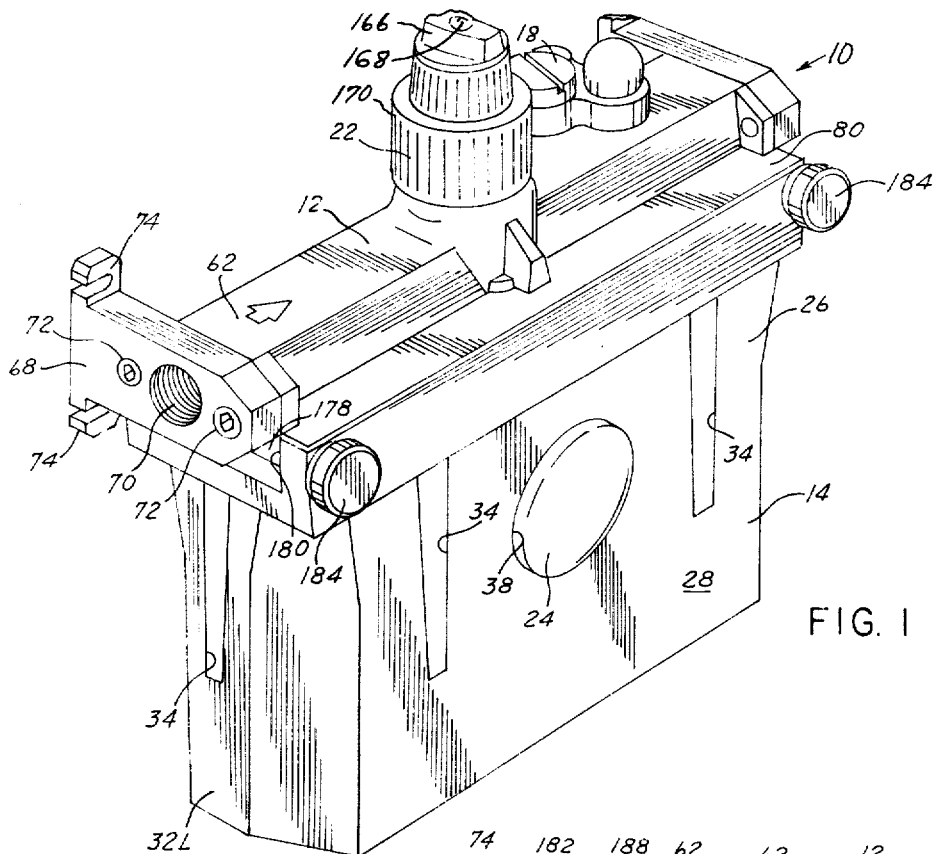
FIG. 1 is a perspective view looking down and to the right at the combination filter-regulator-lubricator unit of the present invention arranged such that flow is from lower left to upper right.
Figure 6:
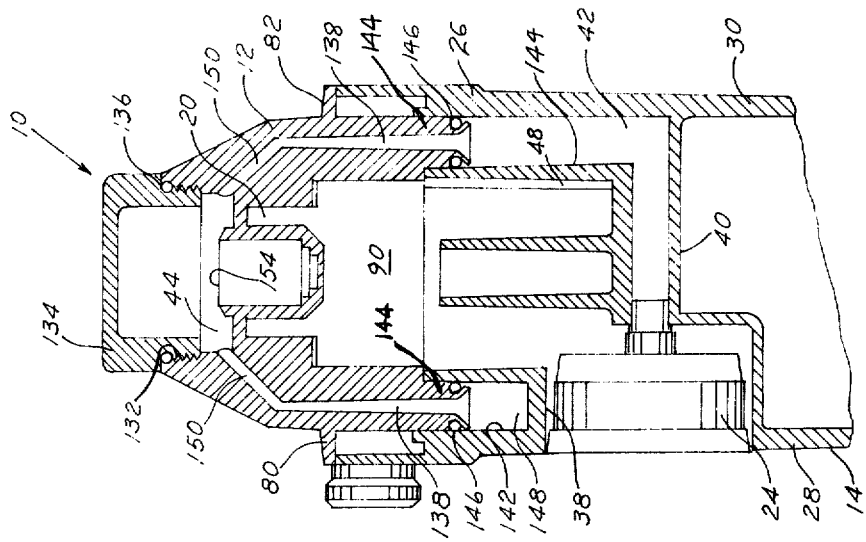
FIG. 6 is a fragmentary transverse section similar to FIG. 4 but of the FIG. 5 modification taken along line 6—6 of the latter Figure; and, FIG. 7 is an exploded half section similar to FIG. 3 and to the same scale differing therefrom only in that the manifold has been reversed end-for-end such that the flow is from right to left.
Figure 5:
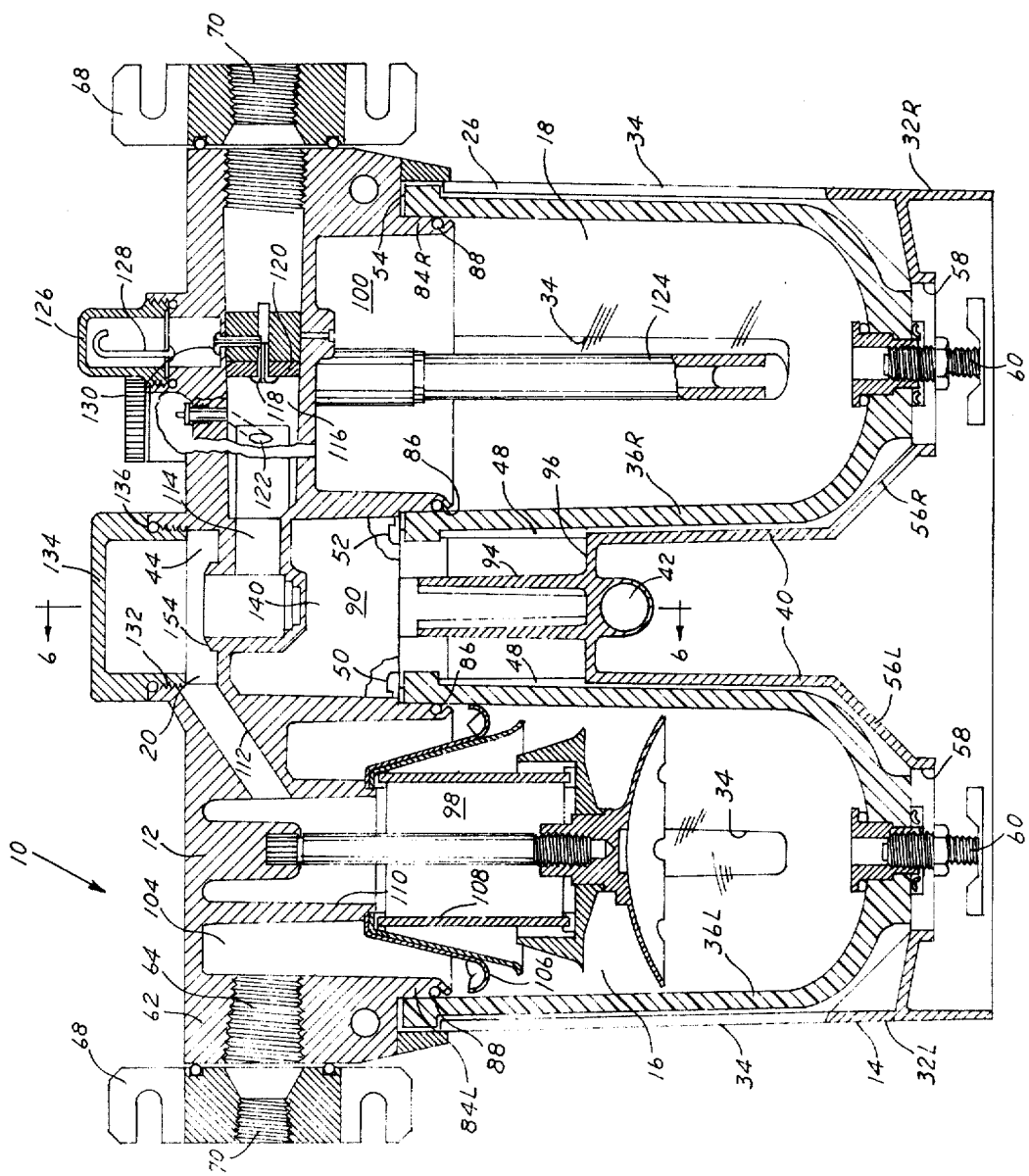
FIG. 5 is a half section like FIG. 3 and to the same scale as the latter showing a modified version of the unit in which the regulator section has been eliminated and a cap substituted for the control valve.
Figure 7:
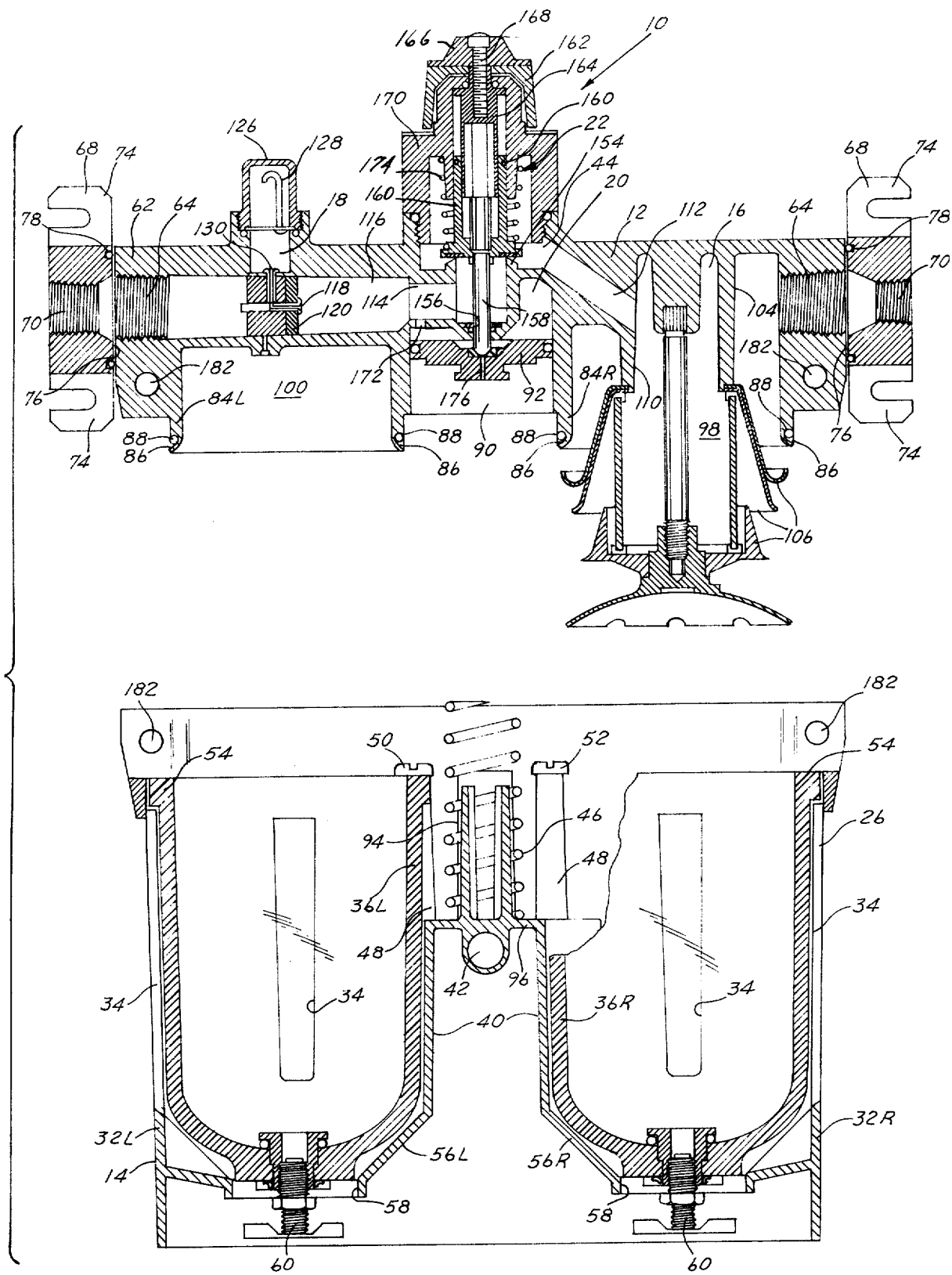

As can be seen with specific reference to the exploded view of FIG. 7, the entire bowl-carrying subassembly 14 is symmetrical about a transverse centerline such as that upon which the sections shown in FIGS. 4 and 6 are taken. As so constructed, the bowl subassembly will mate with the manifold subassembly 12 either with the filter on the left as shown in FIGS. 1 and 5 or on the right as shown in FIG. 7. Furthermore, the foregoing relationship can be achieved regardless of whether the combination unit includes regulator 22 or not, the only difference insofar as the bowl subassembly is concerned being whether the compression spring 46 is left out.

Figure 3:
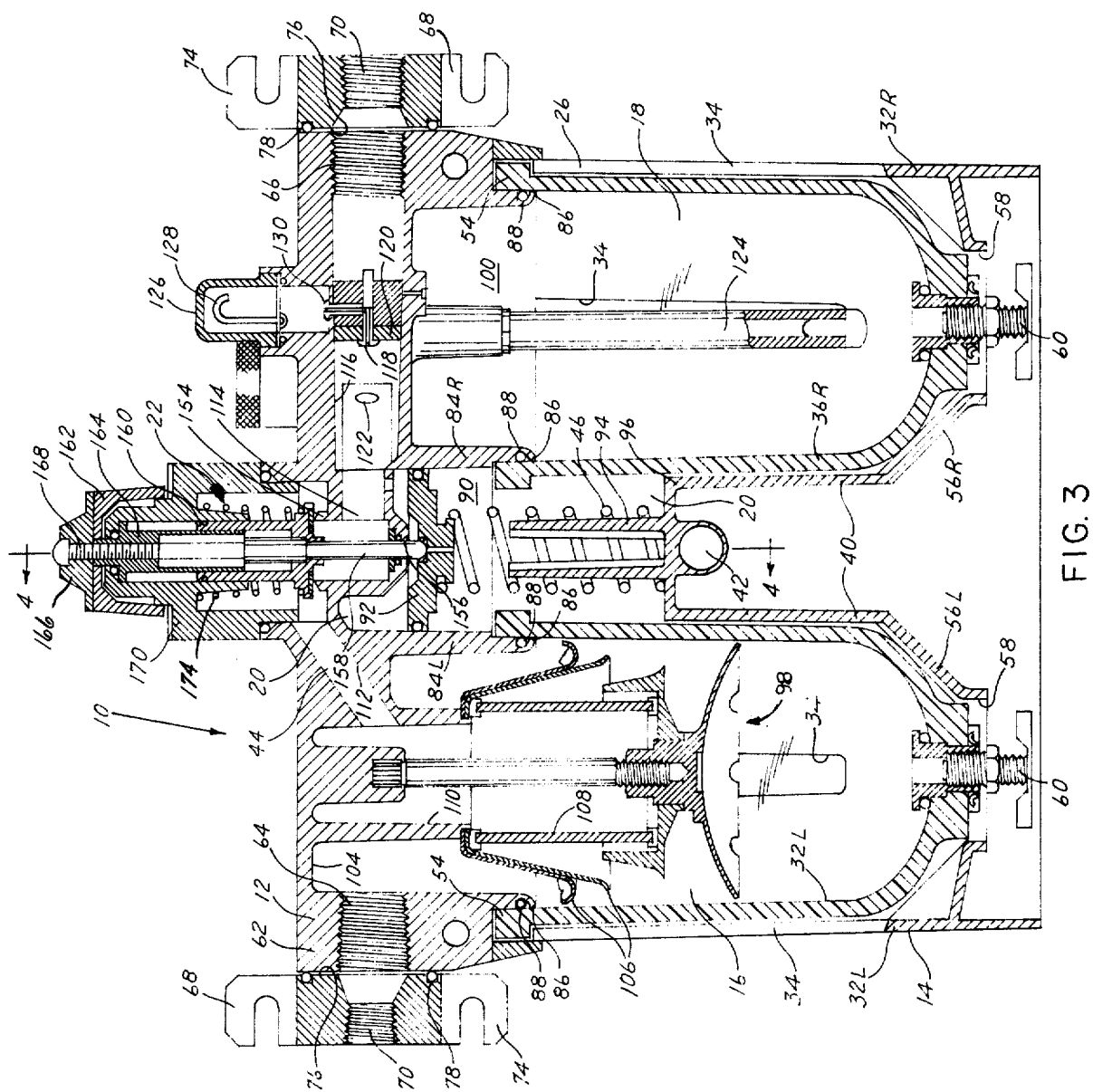
FIG. 3 is a longitudinal half section of the combination unit illustrated in FIG. 1 but to approximately the same scale as FIG. 2 and showing a different wall-mounting bracket than the latter.

It will be noted, with reference to FIGS. 3, 5 and 7, that both bowls 36L and 36R are identical transparent plastic bowls ones with conventional screw-type petcocks 60 in the bottom. While such an arrangement is preferred in that it contributes to the versatility of the combination unit, it is by no means essential because the bowls are both removable and interchangeable in the shell 26. This means, of course, that other well known types and styles of bowls can be substituted for one or both of those shown and such is contemplated within the teaching found herein. Similarly, other types of drain valves including automatic valves can be substituted for the petcocks 60 shown.

The construction of the manifold subassembly 12 is shown in detail in FIGS. 3, 4, 5 and 6. The main body 62 of the manifold is a cast unit having an internally-threaded inlet 64 adjacent the filter section 16 and a similarly designed outlet 66 at the opposite end by the lubricator section 18. Both the inlet and outlet are preferably made one standard size say, for example, ½ inch while the mounting brackets 68 include a passage 70 therethrough that adapts same to whatever size of supply line piping is in use. By way of example, FIGS. 3, 5 and 7 show the mounting bracket 68 on the inlet end of the manifold as having a ⅜ inch upstream tap widening out to a full ½ inch at its downstream end. These same Figures show the bracket on the outlet end of the manifold as having a ½ inch upstream entryway reduced down to a ⅜ inch downstream end. Obviously, this has been done only for purposes of illustration and is not intended as being exemplary of the unit in actual use where, under all but rare circumstances, the supply piping will be the same size entering as leaving the unit. It should suffice to point out that a proper choice of mounting brackets enables the user to integrate the combination unit into his supply line without resorting to special fittings even though it is different than that of the manifold.

Figure 2:
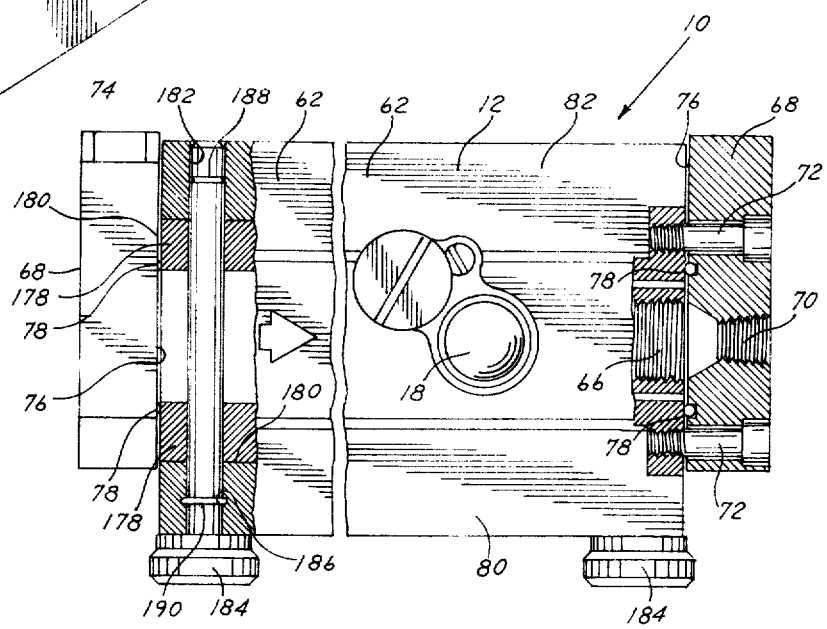
FIG. 2 is a top plan view to an enlarged scale with portions broken away to conserve space and other portions broken away and shown in section.

As shown in FIGS. 1 and 2, the mounting or wall brackets 68 are detachably secured to the inlet and outlet ends of the manifold by bolts 72. Each bracket has a pair of slotted ears 74 at its rear extremity that enable same to be fastened to the wall or other supporting surface in the usual manner. The faces 76 of the brackets that mate with the ends of the manifold 12 each include an O-ring groove encircling the adjacent end of passage 70 therethrough and in which is mounted a conventional O-ring seal 78. The brackets 68 are mounted on the supporting surface in position such that they can be drawn up tight against the ends of the manifold with bolts 72. In the event the unit needs to be replaced or serviced, these brackets will almost always yield enough play to permit the manifold to be slipped easily from its position therebetween, whereupon a standby manifold can be connected up and the system returned to service almost immediately.

The main body 62 of the manifold as shown in FIGS. 1, 2, 4 and 6, includes integrally-formed overhanging flanges both front and rear that have been designated by reference numerals 80 and 82, respectively, and which mate with the upper marginal edges of shell 26 to form a lid therefor. Also depending from the underside of the main body of spaced-apart the manifold are a pair of integrally-formed annular skirts 84L and 84R, both of which are shown centered with respect to the front and rear margins thereof as well as being spaced equidistant on opposite sides of its transverse centerline. Each of these skirts is bordered by an annular O-ring groove 86 containing the usual O-ring seal 88 that, upon entering one of the bowls 36, forms a fluid-tight seal therewith when the bowl-carrying subassembly 14 is in assembled relation on the manifold 12 as shown in FIGS. 3 and 5.

Interposed between these two annular skirts 84 in essentially tangential relation thereto is a third skirt 90 shown in each of the FIGS. 3–7, inclusive. The inside of this skirt is cylindrical and, as such, defines the cylinder within which piston 92 of the regulator 22 reciprocates as shown in FIGS. 3, 4 and 7. This piston is normally biased upwardly by compression spring 46 that is retained by an upstanding hollow vertically-slotted post 94 formed integral the horizontal portion 96 of the partition wall 40 in the shell 26.

Referring to FIGS. 3, 5 and 7, a filter component is broadly referred to by reference numeral 98 and a lubricator component is similarly referred to by reference numeral 100. The filter component of the combination is of a conventional construction and the particular form illustrated is but one version of several such air line filters that are commercially available. The same is true of the lubricator 100, although the particular lubricator 102 that has been shown incorporates a number of novel features not found in the prior art regulators. For present purposes, therefore, it should suffice to point out that filter 98 and lubricator 100 are intended as being merely representative of many such filters and lubricators that may be utilized in the filter and lubricator sections 16 and 18 of the combination unit. Air enters the manifold 12 through inlet 64 where it passes into annulus 104 before passing over the baffles 106 of the filter 98 and through filter cartridge 108 that cooperate in the usual manner to remove the water and entrained particulate matter therefrom, the fluid constituents dropping down into the bottom of the bowl 36L encasing the latter for subsequent removal. The filtered air then passes up into central cavity 110 of the manifold where it is discharged through port 112 of the main air passage 44 into the regulator section 20.

In the regulator section 20, the filtered air is either reduced in pressure to a preselected value or sent directly to the lubricator section 18 without having its pressure reduced. Ultimately, in either instance, the air emerges from port 114 in the regulator section 20 of the main air passage 44 and is discharged into the lubricator section 18 of the manifold 12.

In the particular lubricator 100 shown, the main flow of air is through section 116 of the main air passage 44 in the manifold, restricted orifice 118 of movable element 120, and outlet 66. In the event downstream demands exceed the volume of air that can pass through passage 118, movable element 120 will actuate to allow the necessary increment of additional air needed to satisfy the demand pass around the orifice without picking up any oil. Upstream of valve element 120 some air is bled off through bypass 122 where it passes through an ordinary tire valve housed underneath the fill plug and down into the bowl which will be partially filled with oil. Oil is forced up the syphon tube 124 by the positive air pressure in the bowl where it eventually emerges in dome 126 through drip tube 128 after having passed through passages in the manifold that have not been illustrated. Oil from the drip tube moves down into intersecting passage 130 where it enters the high velocity air stream passing through orifice 118 and is dispatched downstream in the form of a fine mist.

Once again, no particular novelty is ascribed to the lubricator shown as it is intended as being merely illustrative of one such lubricator that can be incorporated into the combination unit of the present invention, there being many others. In fact, under certain applications, air free of essentially all contaminants is needed such as, for example, in breathing apparatus and around food. Obviously, in circumstances such as these, oil vapor would not be added to the air stream, but instead, steps would be taken to remove any oil along with odors, bacteria and other airborne contaminants. Accordingly, in applications such as these, the lubricator can be eliminated and a second filter substituted therefor having the capability of removing submicron sized particulate matter. This secondary filter could easily be incorporated into the combination unit of the present invention in place of the lubricator shown by one of ordinary skill because all that is required by way of modification is to change the downstream section of the manifold beyond regulator section 20 to conform to the design of the head of a secondary filter that is used as a separate entity. A modified embodiment of the combination unit is shown in FIGS. 5 and 6. In this modification the regulator section 20 includes only pressure gage 24 and has no pressure regulator 22. The manifold includes an internally-threaded opening 132 connecting the main air passage 44 within the regulator section 20, which section is covered and sealed by means of a cap 134 and O-ring 136. Branch passages 138 are provided in the manifold (FIG. 6) extending from the main air passage 44 to the front and to the rear where they open through the lower ends of integrally-formed elements 140 that telescope into corresponding elements 142 and 144 formed as parts of the partition wall 40 of the shell 26 adjacent its front and rear walls. O-rings 146 encircle the elements 140 of the manifold and seal same within the corresponding elements of the shell as shown in FIG. 6. Front element 142 in the partition wall of the shell defines a blind passage 148, whereas, its counterpart 144 in the rear defines the previously-mentioned passage 42 that connects into the pressure gage. Obviously, whichever of the elements 140 of the manifold lies at the rear will connect into passage 42 of the shell and actuate the pressure gage while the other of said manifold elements 140 at the front thereof will be rendered inoperative.

Now, comparing FIGS. 4 and 6, it will be seen that branch passages 138 in the two-component version of the combination unit illustrated in FIGS. 5 and 6 differ from the corresponding passages 138M in the three-component version of the remaining Figures. Actually, the manifold is molded with only the lower portion of passages 138 or 138M completed. Then, if a customer orders the twocomponent version of FIGS. 5 and 6, passages 138 are completed by connecting them up to the main air passage 44 by drilling out passages 150 shown in FIG. 6. If, on the other hand, a customer orders a three-element unit, modified passages 138M are completed as shown in FIG. 4 by drilling passages 152 into them from a position beneath valve seat 154 and above piston 92.

The threecomponent version of the manifold 10 has been shown in FIGS. 1, 3, 4 and 7. In this form, the manifold 12 has been modified as described above to accommodate the regulator 22, in that it has the different arrangement of fluid passages 138m that have already been described and, in addition, a hole 156 is drilled in the bottom wall of the valve seat to receive valve stem 158 that bears against the top of the piston 92.

The pressure regulator 22 in the particular form disclosed herein has its stem 158 threaded through valve member 160. Control knob 162 is attached to coupling member 164 and it, in turn, is connected to the valve stem so as to rotate same. This same coupling member is attached to lock knob 166 by means of screw 168 such that if said lock knob is turned down tight, it will cooperate with the coupling 164 to force the control knob 162 down firmly against the valve body 170 so that the stem cannot be turned.

As the stem is moved up and down relative to the valve member 160, it acts through floating piston 92 to either further compress or release some of the compressive force acting on spring 46. As the spring bias on the piston increases, it will push upon the stem which telescopes into the coupling element and, at the same time, raises the valve member 160 off its seat thus permitting air to move past the latter and on through the main air passage 44. At such time as the pressure in the main air passage downstream of valve element 160 bleeds through orifice 172 and acts upon the top of piston 92 so as to depress same and overcome the spring bias exerted thereon, then it will drop down and allow spring 174 to close valve 160. If, on the other hand, the valve 160 is closed and the downstream pressure above piston 92 is sufficient to overcome the spring bias exerted thereon and drop it down further, it will immediately move out of contact with the valve stem thus permitting air to flow through orifice 176 in the center of the piston until an equilibrium condition is, once again, established.

An ordinary pressure regulator functions in a significantly different way, the main difference being that instead of changing the effective length of the valve stem, it remains the same and the position of the spring abutment opposite piston 92 is adjusted. Here again, the pressure regulator that has just been described is intended as being merely illustrative of one such regulator that can be used in the three-element combination unit of the present invention and, while it is considered novel, such novelty forms no part of the instant application.

The manner in which the bowl-carrying subassembly 14 is detachably connected to the manifold 12 is shown in FIGS. 1, 2 and 7. The manifold has tongue-forming portions 178 at its opposite ends which fit down into corresponding slots 180 in the sides of the bowl-carrying subassembly. Transversely-extending aligned openings 182 extend through both the manifold 12 and bowl-carrying subassembly 14 at opposite ends thereof when these elements are in assembled relation. Retractable pins 184 within these same openings releasably lock the manifold 12 and bowl subassembly together, yet enable the bowl subassembly to be removed from service and replaced with minimum disruption in service and without special tools. The portions of the pins lying within the confines of the front and rear walls of the shell contain annular grooves 186 and 188 while the opening 182 in the front wall is similarly grooved to receive spring 190. In the extended position shown in FIG. 2, spring 190 drops into the pin-encircling groove 186 nearest the head thereof and is thus releasably retained in latched position. Similarly, in the retracted position of the pin, spring 190 drops into the groove 188 in the end remote from the head to provide the same kind of releasable connection.

What is claimed is:

1. A multiple-function unit for treating air comprising a body having an air passage therethrough with an inlet at one end and an outlet at the other and defining a manifold; first air-treatment means connected into said manifold air passage adjacent the inlet thereof and being operative to intercept the airstream in the manifold air passage and to modify said airstream before returning said stream thus modified to said manifold air passage; second air-treatment means connected into said manifold air passage adjacent the outlet thereof and being operative to intercept the airstream issuing from said first air treatment means and to further modify said airstream before returning said airstream to said manifold air passage outlet; a bowl-carrying subassembly symmetrical about its transverse centerline and detachably connected to said manifold in cooperation therewith to define separate, but identical chambers housing elements of said first and second airtreatment means; a bowl forming each of said chambers attached to said bowl-carrying subassembly; and symmetrically-arranged mating elements symmetrical about their transverse centerlines carried by the opposed surfaces of said manifold and said bowl-carrying subassembly and cooperating with one another in assembled relation whereby said manifold and said bowlcarrying subassembly can be reversed end-for-end relative to each other.

2. A multi-function unit as set forth in claim 1 wherein said bowl-carrying subassembly includes a single open-topped shell, said shell upon attachment to said manifold supporting both of said bowls attached therein in air-tight sealed engagement with said body, and said bowls when thus sealed defining reservoirs for the containment of any material either taken from or to be added to the airstream by the air treatment means associated therewith.

3. A multi-function unit as set forth in claim 2 wherein said shell is formed with front and rear walls, a centrally-located partition wall, end walls and a bottom wall cooperating with one another to define a pair of generally cup-shaped bowl-receiving pockets shaped to receive and hold said attached bowls in position to engage and form an air-tight seal with said mating surface of said manifold.

4. A multi-function unit as set forth in claim 3 wherein the shell walls cooperate with one another and with said body to define a protective shield covering said bowls.

5. A multiple-function unit as set forth in claim 2 wherein said shell has the front and rear walls interconnecting with the end walls, and including window-defining vertically-disposed slots in at least said front wall opening onto both of said bowls.

6. A multiple-function unit as set forth in claim 2 including removable stops carried by said shell in overhanging relation to the rims of said bowls, said stops cooperating with said shell to retain said bowls in the latter when said bowl-carrying subassembly is detached from said manifold.

7. A multiple-function unit as set forth in claim 2 wherein at least one of said bowls has a drain opening in the bottom thereof with a drain valve mounted therein, and said shell includes a bottom wall in supporting relation to the bottom of said bowls, said bottom wall having an opening therein located and sized to receive said drain valve.

8. A multiple-function unit as set forth in claim 2 wherein said manifold air passage includes a branch passage communicating therewith; said shell having a gage-viewing opening in one exposed face thereof and conduitforming means positioned and adapted to connect into said branch passage in air-tight sealed engagement therewith when said shell and said manifold are assembled together; and a pressure gage visible through said gage-viewing opening and connected into the end of said conduit-forming means opposite the end which connects into said branch passage.

9. A multi-function unit as set forth in claim 8 wherein said branch passage is further branched to define a pair of identical outlets positioned on the transverse centerline of said manifold and symmetrically located relative to the longitudinal centerline of said manifold, said manifold including plug-forming means carried by said shell and positioned to close the unused outlet of said further branch passage when said manifold and said bowlcarrying subassembly are assembled to interconnect said conduit-forming means and other outlet.

10. A multiple-function unit as set-forth in claim 1 wherein said first air-treatment means comprises an air filter.

11. A multiple function unit as set forth in claim 1 wherein said second air-treatment means comprises a lubricator.

12. A multiple-function unit as set forth in claim 1 further comprising pressure reduction means connected into said manifold air passage intermediate said first and second air-treatment means.

13. The multiple-function unit of claim 12 wherein said manifold includes a cavity intermediate said first and second air-treatment means and communicating therewith and wherein said pressure reduction means comprises a pressure-responsive element mounted for movement within said cavity and cooperating therewith to define a pressure chamber of variable volume, valve means located within said air passage upstream of said pressure chamber and operative in closed position to shut off the flow of air through said air passage, first biasing means normally biasing said valve means into closed position, link means interconnecting said pressure-responsive element with said valve means and operative upon movement of said pressure-responsive element in a direction to reduce the pressure chamber volume to open said valve means, and second biasing means connected to said pressure-responsive element normally biasing said element in a direction to reduce the pressure chamber volume, said second biasing means cooperating with said pressure responsive element and said link means under the influence of a pressure in the pressure chamber below a preselected value to open said valve means in opposition to the bias exerted thereon by said first biasing means, and cooperating when the pressure in the pressure chamber rises above said preselected value to increase the volume of the latter in opposition to the second biasing means whereby said first biasing means closes said valve means.

14. A multi-function unit as set forth in claim 13 including adjustable means in operative association with one of said first and second biasing means and with said pressure-responsive element for changing the magnitude of said preselected value at which said valve means will actuate.

15. A multi-function unit as set forth in claim 1 further including a pair of mounting brackets operatively associated with one another when mounted in longitudinally-spaced parallel relation to define a support sized to accept said manifold therebetween in either of two positions reversed end-for-end; said brackets each having a passage therethrough aligned in assembled relation with either said inlet or said outlet of said manifold depending upon its orientation relative thereto, and said brackets defining couplings for connecting said manifold into an air line.

16. A multi-function unit as set forth in claim 15 including an O-ring interposed between the mating faces of said manifold and said mounting brackets in encircling relation to said passages therethrough, said O-rings producing air-tight yieldable seals adapted to permit said manifold to be removed from between said brackets without disturbing said brackets.

17. A multi-function unit as set forth in claim 15 wherein the sizes of said passages in said mounting brackets are different from the sizes of said inlet and said outlet passages of said manifold so as to accommodate compressed air supply piping of various sizes.

18. A multiple-function unit as set forth in claim 1 wherein said mating elements comprise cooperating tongue and groove means, said tongue and groove means having openings therethrough registering with one another in assembled relation, and a retractable latch pin mounted within each of said registered openings for reciprocal movement between a locked and unlocked position, said pins cooperating with said interengaged tongue and groove means to define releasable latches therefor.

19. A multi-function unit as set forth in claim 18 wherein said pins are encircled by grooves at opposite ends thereof; and in which a spring is mounted within each of said registered openings adjacent the entryway thereto adapted to cooperate with said grooves to releasably retain said pins in either their extended or retracted positions.

20. A multi-function unit as set forth in claim 1 wherein the portions on opposite sides of both the transverse and longitudinal centerlines of the mating surfaces of both said body and said bowl-carrying subassembly are mirror images of one another.

21. A multiple-function unit for treating air, said unit having a body with an air passage therethrough, said body having an inlet and an outlet for said air passage, first means in said body connected to said inlet for modifying the air at said inlet and for delivering the air to said passage, second means in said body connected to said outlet for modifying the air in said air passage and for delivering the air to said outlet, and a reversible housing for defining separate chambers in said air passage around said first and second modifying means, said reversible housing comprising:
  an open-topped shell for detachably connecting to said body over said first and second modifying means,
  a pair of bowls disposed and attached within said shell for defining said separate air chambers,
  groove means on the surface of said body having a symmetrical configuration about the transverse centerline of said body for mating with said open top of said shell,
  tongue means on the surface of the open top of said shell having a symmetrical configuration about the transverse centerline for mating with said groove means, said tongue means being able to mate with said groove means even though said body and said shell are reversed end-for-end relative to each other, and
  pin means for releasably connecting said tongue means to said groove means so that said bowls are held firmly in sealed relationship with said air passage.

22. The multiple-function unit of claim 21 wherein said shell comprises, detachable means in sealed communication with said air-passage of said body when said shell is in said air-tight sealed engagement with said body for measuring the air pressure in said air-passage, and a first means on one side of said shell for retaining said measuring means so that said measuring means can be readily observed.

23. The multiple-function unit of claim 21 further comprising:

a cavity intermediate to and in communication with said first and second modifying means, said cavity being part of said air-passage, and means releasably connected into said cavity for reducing the pressure of the air between said first and second modifying means.

* * * * *